United States Patent [19]

Frissora

[11] 4,262,658
[45] Apr. 21, 1981

[54] DRAINABLE SOLAR COLLECTOR APPARATUS

[75] Inventor: Joseph R. Frissora, Corning, N.Y.

[73] Assignee: Owens-Illinois, Inc., Toledo, Ohio

[21] Appl. No.: 918,995

[22] Filed: Jun. 26, 1978

[51] Int. Cl.³ ............................................ F24J 3/02
[52] U.S. Cl. ............................................... 126/443
[58] Field of Search ................................... 126/443

[56] References Cited

U.S. PATENT DOCUMENTS

| 4,002,160 | 1/1977 | Mather | 126/443 |
| 4,018,215 | 4/1977 | Pei | 126/443 |
| 4,033,327 | 7/1977 | Pei | 126/443 |
| 4,043,318 | 8/1977 | Pei | 126/443 |
| 4,120,285 | 10/1978 | Nugent | 126/443 |

*Primary Examiner*—Carroll B. Dority, Jr.
*Attorney, Agent, or Firm*—John R. Nelson; Myron E. Click; David H. Wilson

[57] ABSTRACT

The invention disclosed is a liquid constant flow, drainable solar energy collector system in which a manifold feeds several evacuated glass tube solar collectors disposed on an upward side of the manifold. The collectors are fed in parallel through an individual orifice which restricts flow rate to each solar tube. The normal outlet of each solar tube is via an axial glass pipe which extends to its top region. The orifices are all connected to a common header pipe in the manifold and the glass outlet pipes are all connected to a separate common header pipe in the manifold. For each solar tube the outlet pipe is of sufficient diameter in relation to the orifice so liquid that overflows the pipe does not completely fill it thereby always allowing an air vent passage via the same pipe. The restricted orifices are provided by inserts removably installed between their common header pipe and each of the solar tubes. The manifold is sloped to its drain and the collectors are sloped to the manifold providing full drainability; and the collectors may use pure water without danger of freeze up or need for anti-freeze mixture.

30 Claims, 8 Drawing Figures

DRAINABLE SOLAR COLLECTOR APPARATUS

The present invention relates to the collection of solar radiant energy and transforming that energy to heat in a liquid, such as water; and more particularly to an evacuated tubular collector device used in a circuit whereby the collector is efficiently and safely operable by drainability in the circuit.

BACKGROUND OF THE INVENTION

Advanced, efficient solar collectors of the type disclosed in U.S. Pat. Nos. 3,952,724; 4,043,318; 4,018,215; and 4,033,327 are currently in use. The collectors are comprised of glass concentric tubes, one within the other, and sealed together to provide an annular space between them that is evacuated to a hard vacuum i.e. $10^{-4}$ Torr. The outer "cover tube" is transparent and the inner "absorber tube" is selectively coated over the surface that is in the vacuum space. These tubes are inserted in liquid tight connections in a manifold and placed along opposite sides of the manifold which cross-connects the tubes to each other and serially connects the tubes along the manifold such that liquid, e.g. water, is pumped into each of the absorber tubes to fill them and pumped through the tubes in series to extract and collect the heat of the solar radiation absorbed by the absorber tubes.

The collectors also are equipped with various reflectors, as is set out in U.S. Pat. No. 4,002,160, such that diffuse as well as direct sunlight reach the absorber tubes of the device.

It is most significant to utilize water as the heat extraction medium for many uses and for many reasons; which include the economy and availability of water, its desirable thermal coefficients as a heat extraction medium, and its non-toxic properties. On the other hand, water freezes at relatively undesirable high temperature in field service and during inactive periods in cold climates, such as in the northern regions of the United States in winter, requiring precautions against freeze up in the system. Heretofore, mixes of anti-freeze compounds in the water have been used as one way to combat this problem, however, such measures introduce toxic properties to the heat extraction media.

Also, in the prior systems wherein water is used with or without anti-freeze compounds in mixtures, the collector system must be operated continuously to extract the heat of the solar energy collected so as to prevent excessive operating temperature buildup on the tubes. Accordingly, as an example of domestic hot water demand or heating and cooling demands or the combination thereof in a solar operated installation there are periods, such as in spring or fall seasons, when excess solar energy is being absorbed by the collector of the system over the needs or demand for thermal energy thereby.

The excess collection requires "dumping" some of the energy, that is, the excess must be diverted to special air handlers or cooling towers resulting in nonproductive energy cost and equipment expenditure of a system.

SUMMARY OF THE INVENTION

The present invention provides a drainable collector apparatus for use in a system which will permit a variety of methods of operation in extraction of the heat from absorbed solar radiation; and will provide complete drainability of the liquid upon command or upon power failure; and pure water can be used in the system without danger or freeze up by virtue of the ability to fully drain the collectors; i.e. the absorber tubes. The drainable collector comprises an elongated manifold which feeds a number of the evacuated collector tubes connected on the higher elevation side of the manifold such that the manifold is at the lower elevation of an array of the tubes. The liquid is fed into each tube from the manifold through an orifice designed to restrict the flow rate into each tube and the tubes are all connected in parallel on the manifold. The restricted orifice supplies a pressure drop across it at the entrance of liquid to the tube and this is substantially greater than the pressure drop along the length of the manifold connecting the several tubes together, plus any difference in elevation of the outlet of the collector tubes along the manifold, i.e. the manifold should be pitched upwardly from its drain end to the far end. The collector tube includes a small diameter longitudinal pipe which extends from the manifold to near the tip end of its absorber tube. The longitudinal pipe has sufficient diameter such that during filling each tube any liquid as may tend to overflow into the pipe will not fill it and thereby always vent the air in the absorber tube.

The basic element in the collector is the restricting orifice located at the base of the collector tube and in the manifold. The combined parameters of the size of restriction provided by the orifice in the base of the tube and the size of the vent pipe allows the collectors to operate without siphoning.

The present invention further provides a tubular collector in which the tubes may be filled in parallel under control and with sufficient pressure drop in the orifice between the main flow in the manifold and inside the absorber tube to enable variations in the elevation of fill of the absorber tubes by reason of some variation in length of the vent pipes resulting in a variation in the elevation of placement of the open tip end within the absorber tube chamber. This feature also avoids siphoning and differential boil of liquid in some tubes of the array and overflow in others. Siphoning may occur at a time when the vent pipe is plugged, such as with an overflow of water sufficient to fill the pipe and retain a slug of water. The invention includes the discovery that a relationship between diameter (I.D.) of the vent pipe and diameter of the restricting orifice should be maintained so as to prevent filling at a rate to overflow the vent pipe full or to obtain the slug-of-water condition. This is best stated as a finite ratio of vent pipe I.D. to I.D. of orifice of a number substantially greater than 1, viz, a ratio of approximately 2.5 or greater; and preferably a ratio above 5.0. The use of the restriction orifice in the liquid system controls liquid flow rate as to gpm such that the vent pipe does not completely fill at any time the pump is on. However, as a theoretical matter, the pumping may be precisely controlled in rate, as a substitute; and therefore, the restricting orifice in the feed of liquid into each of the collector tubes provides the practical control to achieve this and the pumping rate, i.e. the pump itself, need not be so precisely controlled but merely set to a predetermined gpm rate.

The invention also provides a structural arrangement for convenience of manufacture, fabrication, installation and ease of maintenance of the collector array; and, further the array of collectors may be made up of several modular units of collectors in a row, such as by connecting the feed and vent header pipes in the modular manifold sections in an end-to-end fashion. The collector tubes are seated at their open ends in a fabricated cup or receptable that is predrilled to receive soldered fittings for the vent pipe connecting it to the vent pipe along the manifold, and to receive an insert machined prior to assembly to provide the precise restricting orifice in the liquid connection between the liquid feed pipe in the manifold and the inside chamber of the absorber tube. The structure of manifold, tubes and mounting fixtures are fabricated into a modular unit, and the modular units are connected one to another to make the total collector of the installation. Thus, the unit needs only a minimum of assembly in the field.

Other advantages and features of the invention will become apparent from the following description and the accompanying drawings which are illustrative of a preferred embodiment and the contemplated best mode of the invention herein claimed.

DESCRIPTION OF THE PREFERRED EMBODIMENT

Figure 1:
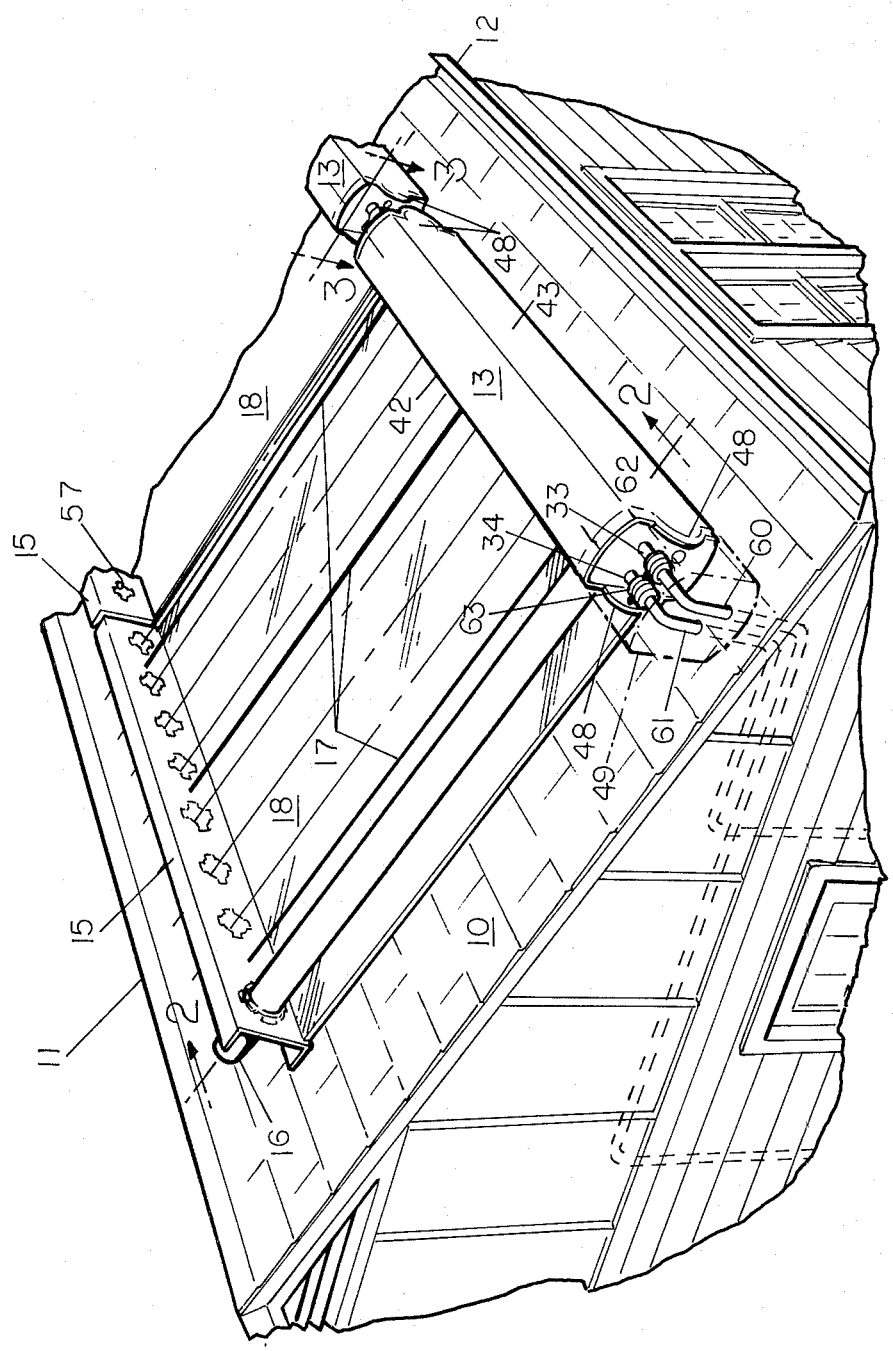
FIG. 1 is a perspective view of the drainable, evacuated tubular solar collector of my invention in operating position on the pitched roof of a building.

Referring to FIGS. 1-5, the drainable solar collector is illustrated in an operating installation on the roof 10 of a building. The roof has some pitch from the upper ridge 11 to the eaves 12. In the illustrated example on FIG. 1, the pitch of about 20° (the angle A) above horizontal is used. (The collector's pitch angle A is variable from very near 0° to near 80°.) The solar collector is preferably installed on a southern exposure (northern hemisphere) of the building such that the axis of manifold 13 lies in the east/west direction and the axes of the parallel array of plural solar collector tubes 14 (but one of which is shown in FIG. 1 for simplicity of illustration) are in the North/South direction. Accordingly, the sun during a "solar day" moves from right to left in FIG. 1 across tubes 14. The tubes 14 are assembled in a modular unit, or units (two of which are indicated on FIG. 1) which comprise the manifold 13, the upper bracket channel 15, tube end caps 16 and the tie rods 17 threaded at their ends and bolted at one end in the manifold (as will be presently described) and bolted at the other end to the channel bracket 15. The modular unit also includes some form of backside reflector, which is in the form illustrated a planar diffuse reflector surface 18, such as disclosed in U.S. Pat. No. 4,002,160, or may incorporate shaped reflectors as is disclosed in U.S. Pat. No. 4,091,796, or in U.S. Pat. No. 4,002,499.

Figure 2:
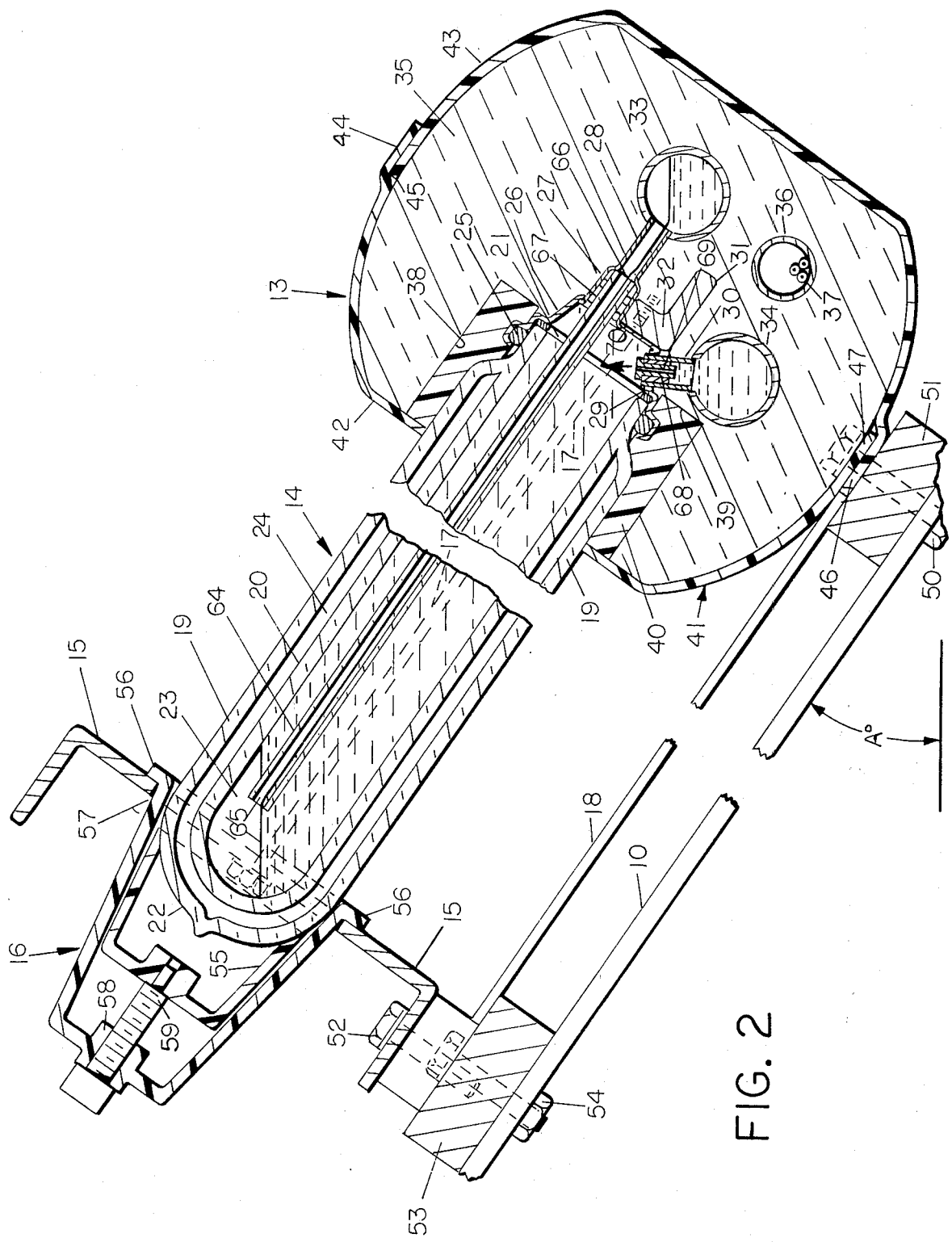
FIG. 2 is a sectional view taken along line 2—2 on FIG. 1.

As shown on FIG. 2, the solar collector tube 14 is comprised of a double wall glass hollow test-tube shaped element having a transparent glass outer wall 19 and radially spaced inner wall 20. Tube 14 is preferably on the order of 2-½ inch O.D. and 4-7 foot length. The outer surface of inner wall 20 is coated with a wave length selective coating and the outer wall 19 is sealed by annular fusion with the inner wall 20 near or at the open end 21 of the double wall glass tube. The enclosed annular space 24 between walls 19 and 20 surrounding the tube is evacuated to a hard vacuum on the order of $10^{-4}$ Torr and tipped-off in conventional fashion at a tubulation on the closed end 22 of the tube. Inside wall 20 defines an interior chamber 23 open at the one end. The tube 14 as constructed is described more completely in the patent to Pei, U.S. Pat. No. 4,043,318, mentioned hereinabove. This comprises an advanced, glass, evacuated tubular solar collector element that is highly efficient in converting solar radiation into thermal energy at the tube interface on wall 20. The energy conversion from solar to thermal is accomplished by the coating on wall 20, and in the use of selective coatings, this conversion is relatively, highly efficient (on the order of 70% efficiency).

The solar tube 14 is connected onto a manifold 13 by a ring gasket or grommet 25 in the flange of annular receptacle or cup 26 of the manifold. There are a plurality of the cups 26 spaced along one side of manifold 13 and each cup opening is facing the same direction. The center axes of cups 26 are substantially parallel. In a preferred construction, cup 26 and a pipe fitting 27 is assembled in the cup bottom by brazing, soldering or the like. The pipe fitting 27 has a lower reduced end pipe 28 that depends in an axial direction from the cup 26. For simplicity of construction, the pipe fitting 27 is placed off center of the bottom of cup 26 on what will eventually be the high elevation side thereof when assembled for operation (see FIG. 2). Along tapered sidewall 29 of the cup and opposite the pipe fitting 27 is a second aperture adjacent bottom end of cup 26 into which a stub-pipe 30 is firmly fastened. The axis of the stub-pipe 30 is located at the low elevation side of the cup in the manifold when assembled for operation (see FIG. 2).

In the assembly of the manifold parts, a steel or structural angle member 31 includes arcuate, spaced-apart notches (not shown) on its upper flange 32 which receive the depending pipe fitting 27 and nest them in place. The bottom end of cups 26 butt on the top of flange 32. This places the cups in their proper attitude for operation, as will become more apparent hereinafter, and the manifold is further fabricated by placing two larger diameter header pipes in place and attaching the connections to the cups, as follows. The end 28 of pipe fitting 27 is securely fastened (e.g. by brazing or soldering) at a preformed opening in air header pipe 33. Pipe 33 extends the length of manifold 13. Preferably, the air header pipe 33 is metal, i.e. copper or brass, which provides a suitable material match with cup 26 and pipe fitting 27. The holes for connecting the ends 28 of the series of fittings of the cups are formed along the length of pipe 33. In a similar manner, the second pipe, which is water header pipe 34 made of a similar material, has the spaced predrilled holes to receive the outer open end of stub-pipe 30, which are likewise securely fastened, i.e. brazed or soldered, onto the pipe 34 thereby connecting each of them into pipe 34.

The manifold insulation 35 is molded around the metal structure, just described, to form the manifold as shown on FIGS. 1 and 2. Additionally, the manifold includes a lengthwise conduit 36 which will receive electric control wires 37 as needed to connect the control sensors and the like. This is added in the manifold structure so that electrical components used with any of the tubes 14 of a collector module or a series of modules may be conveniently located and installed in the system. The manifold insulation 35 is preferably a cellular, lightweight material, such as foamed polyurethane of about 3 lb. per cu. ft. density. The mold in forming the insulation 35 matches with the tops of cups 26 to define annular ports each defined by a continuous side 38 (FIG. 2) and end 39. These ports open along one side of the manifold which will face the high elevation of manifold 13 when the solar tubes 14 are assembled. Foam (rubber or synthetic) inserts prefabricated as cylindrical sleeves 40 are placed in the ports of the manifold and fit adjacent the mouth flange of cups 26. Cylinder sleeves 40 will be compressed by the glass wall 19 of each tube 14 as it is placed in a cup 26 in assembled position. The sleeve 40 being of the compressible material mentioned assures a liquid tight seal of each tube 14 in manifold 13 keeping out rain, moisture or the like. The sleeve further insulates against heat loss or heat transmission at the solar tube's connection in the manifold. The exterior of the insulation 35 is covered with a formed shell 41, which is preferably molded from a fiber glass reinforced, resin sheet as two complementary half segments 42 and 43. The edge 44 of top segment 42 is offset outwardly to overlap with the adjacent edge 45 of lower segment 43. In a similar way the other edge 46 of the bottom segment 43 is outwardly offset and overlaps on the edge 47 of the top segment. The overlaps at 44, 45 and at 46, 47 are fastened together, such as by rivets, to finish the manifold.

As shown on FIG. 1, the opposite ends of the shell for the manifold modular sections include parallel arcuate tabs 48. Prefabricated, half section inserts 49 (in dotted outline on FIG. 1) are placed at the ends of the modules and similar inserts (not shown) are secured in place between modules connected to one another in end-to-end fashion. Intermodular connection of the pipes 33 and 34 is shown on FIG. 3.

As may be seen on FIG. 2, the manifold 13 of a module is attached by nut-bolt fasteners 50 extending through the overlap layers 47, 46 of manifold shell 41, through a stringer member 41 and the roof 10 fastening it in place. It is important that the manifold be pitched down from its end toward the pipe connections for the piping circuits 34 and 33 of the system. Utilizing a pitch angle of about 2° from horizontal will fully drain the collector. At the upper end of the module the bracket channel 15 is fastened by cap screw 52 into an upper stringer member 53 attached to roof 10 by nut-bolt fasteners 54. The reflector, such as a white panel 18, is attached for support by the stringer members 51 and 53.

Tubes 14 are held seated in cups 26 by an end cap device which includes truncated inner cup 55 made of plastic engaging its closed end and an outer plastic truncated cup 16. The outer cup extends through a splined aperture 57 formed in the vertical web of the channel bracket 15 (see FIG. 1). The edge of cup 16 at its large open end has radially extending spaced bosses 56 which match in size and location with the spline cut-outs of the aperture 57 in the bracket 15 so that outer cup 16 and inner cup 55 may be assembled from the side of bracket 15 opposite the manifold. In assembly, the tube 14 is inserted through an aperture 57 and the open end 21 is seated in manifold cup 26 inside gasket 25. The inner cup 55 is placed over the protruding closed end 22 of the tube 14 and outer cup 16 concentrically placed over cup 55 such that the outwardly flanged bosses 56 thereof (FIG. 2) pass through the spline cut-outs of aperture 57 (FIG. 1). After bosses 56 are through aperture 57, the outer cup 16 is twisted (rotated) to lock bosses 56 along the manifold side of bracket 15. Tension is applied to axially load tube 14 in the manifold cup 26 by tightening the center screw 59 in the threads of the journal aperture 58 at the closed end of cup 16 against the closed end of inner cup 55. This loading by tightening screw 59 holds the tube 14 in the manifold cup 26. The end bolted tie rods 17 spaced along the module fasten the bracket 15 and the angle member 32 in the manifold together mechanically to prevent the manifold's buckling; in other words, the manifold 13 is tied rigidly to the bracket channel 15 by the series of rods 17. The rods 17 are disposed along the bracket and manifold, respectively, at spaced intervals located between certain of the tubes 14.

The solar collectors being in place, as described, the one header pipe 33 is connected to a pipe 60 (FIG. 1) of the solar tank system by a hydraulic clamp-style coupling 62; and the other header pipe 34 is similarly connected to a pipe 61 of the solar tank system of the same style of coupling 63. The successive modules mounted in a line along the roof are connected (FIG. 3) together by a hydraulic coupling 62a connecting the lengths of header pipe 33 to each other and a hydraulic coupling 63a connecting the lengths of header pipe 34 to each other. The far ends of the last module in the installation have the pipes 33 and 34, respectively, capped and sealed so as to close the end of that pipe.

Figure 4:
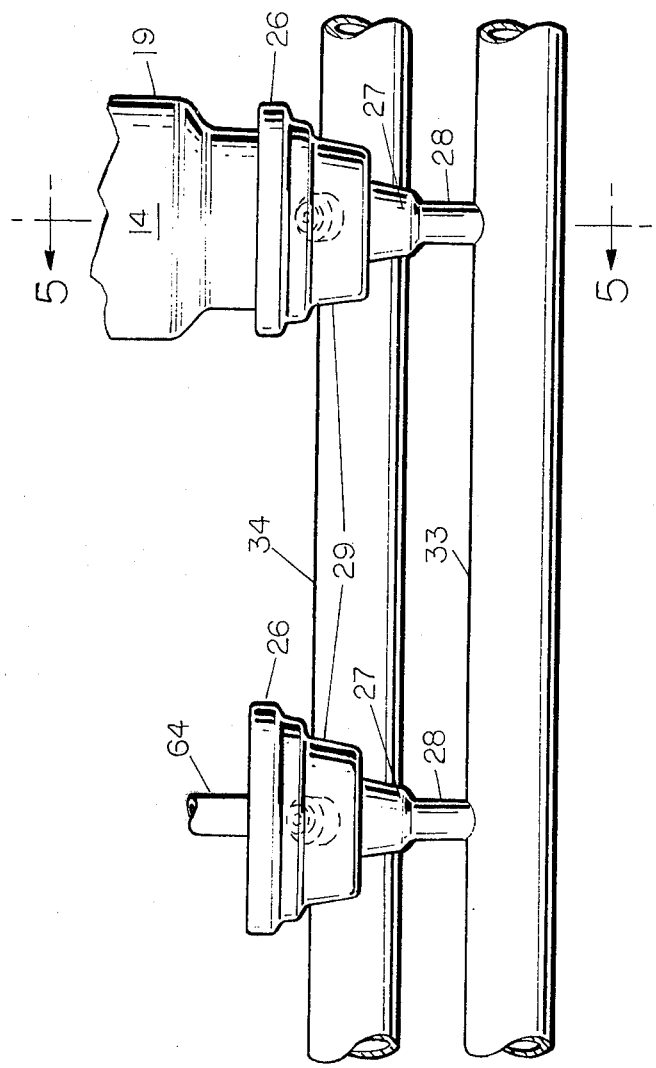
FIG. 4 is a side elevational view of the receptacles for evacuated collector tubes and the connection of each with a liquid feed pipe and an air vent pipe along the manifold, as employed on FIG. 1, minus the manifold insulation and other structural parts supporting the manifold.
Figure 5:
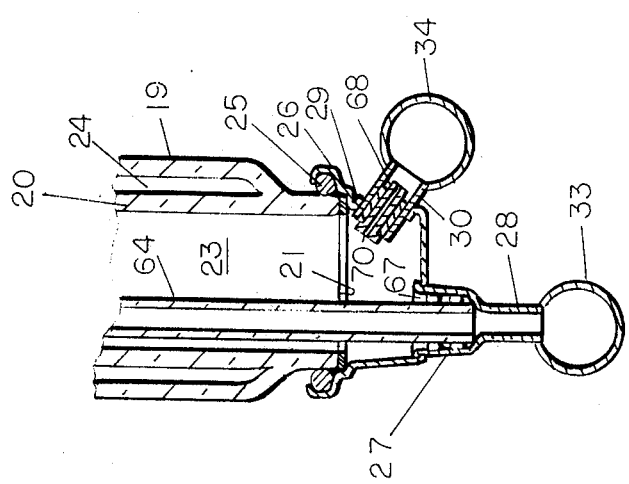
FIG. 5 is a sectional view taken along line 5—5 on FIG. 4.

The important aspect of the invention will now be described in reference to FIGS. 2, 4 and 5. As a key part of the assembly of the tubular collector and manifold in the closed system of the drainable collector of this invention, the pipe fitting 27 in each cup 26 receives an air vent tube 64. Preferably, tube 64 is glass, such as laboratory or chemical tubing. The vent tubes 64 are desirably of equal length and extend such that their open upper end 65 is near the top of the chamber 23 within the tube 14. This is shown in one form on FIG. 2 utilizing a straight length of glass tubing. The lower end 66 of tube 64 is seated in an annular gasket 67 held in the large section of pipe fitting 27.

Another key part of this assembly for each tube is the orifice insert 68 placed in the innermost end of the stub-pipe 30 in the water line and held by a tube-like gasket 69. The insert 68 has a precise size of axially extending passageway 70 bored through it to connect water in pipes 34, 30 to the chamber 23 inside solar tube 14. The insert 68 may take other forms such as by threading it in pipe 30 or swagging it therein, etc.; however, it is desirable to remove inserts 68 from time to time for operational reasons or for maintenance. Therefore, it is desirable to provide a readily removable insert in pipe 30.

OPERATION OF THE COLLECTOR

Figure 6:
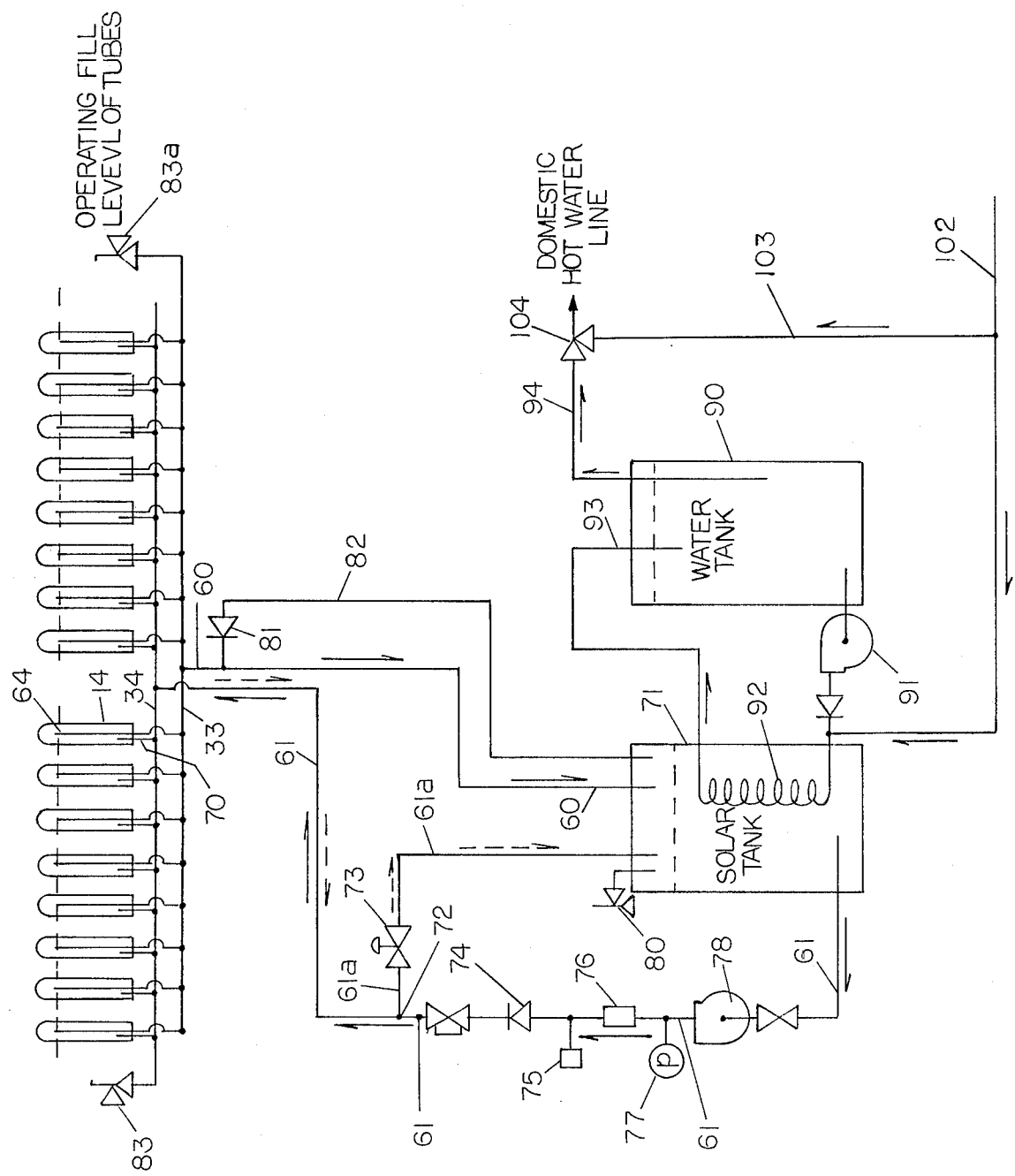
FIG. 6 is a schematic diagram for the drainable solar collector, shown on FIG. 1, connected for use in a system for producing solar heated water.

An installation of the collector is schematically illustrated on FIG. 6 in use in a hot water system. The header pipe 33 is shown in an alternative hook-up of collector modules wherein pipe line 60 is T-connected to the header 33 at an intermediate point between modules. In similar fashion, the water header pipe 34 is T-connected to the pipe line 61. In such installation, the 5 manifolds on either side of the T-connections is sloped slightly toward their drain end into the pipes 60, 61. Pipe 60 extends into the top level of solar water tank 71, preferably into the head space of that tank. The pipe 61 extends to a junction point 72 from which one leg of pipe 61a is connected to a solenoid-operated valve 73. At the opposite side of this valve the pipe extends into the top portion of tank 71. Beyond pipe junction 72, pipe line 61 is connected in series to a one-way check valve 74, a flow regulating valve 75, flow-rate meter 76, water pressure gauge 77 and the outlet side of a centrifugal motor driven pump 78. Pipe 61 is connected at the inlet side of pump 78 into the bottom strata of the solar water tank 71. The circuit of the system just described is a closed system and includes a pressure relief valve 80 on the tank 71 and a vacuum breaker vent 81 in a pipe 82 that is connected in the line 60 near the collectors and extends into the air space (headspace) in tank 71. Also, relief valve 83 is attached onto the fill pipe 34 and relief valve 83a is attached onto vent pipe 33. The relief valves 80, 83 and 83a are set at suitable pressures for normal operation of the system; e.g. valve 80 releases at 25 psi, valve 83 releases at 28 psi and valve 83a releases at 30 psi. In the invention, it is preferable to set relief valve 83 to release at pressure below the setting of relief valve 83a. Should the fill line 61 become blocked to tank, liquid will release at valve 83 when gas pressure in the tubes 14 become excessive and close again when the pressure in the tubes return to neutral. Should both lines 61 and 60 become blocked to tank 71 and relief valve 83 malfunction, relief valve 83a will release excessive gas pressure in the tubes 14 and close again when the pressure in the tubes return to neutral. Should both lines 61 and 60 become blocked to tank and relief valve 83 malfunction, relief valve 83a will release excessive gas pressure in the tubes 14 and close again when pressure in the tubes return to neutral. Any time the gas pressure in the system, including pressure in the headspace of tank 71, becomes excessive, relief valve 80 will release to a neutral pressure. The relief valves provide a triple safety factor in the event of malfunction in venting or draining in the system.

In the illustrated hot water system of FIG. 6, a conventional hot water tank 90 with electric resistance or gas fired heater as standby energy is connected near the bottom to the inlet of pump 91. The pump outlet is connected to a heat exchanger coil 92 inside solar tank 71 and it is connected to the top of tank 90. The hot water is withdrawn from tank 90 through pipe 94 connected to conventional mixing valve 104 which may be thermostatically operated. Also, cold water supply line 102 is T-connected to the pump circuit 91–93 to supply make-up water to the tank 90 and T-connected by pipe 103 to the mixing valve 104.

Figure 7:
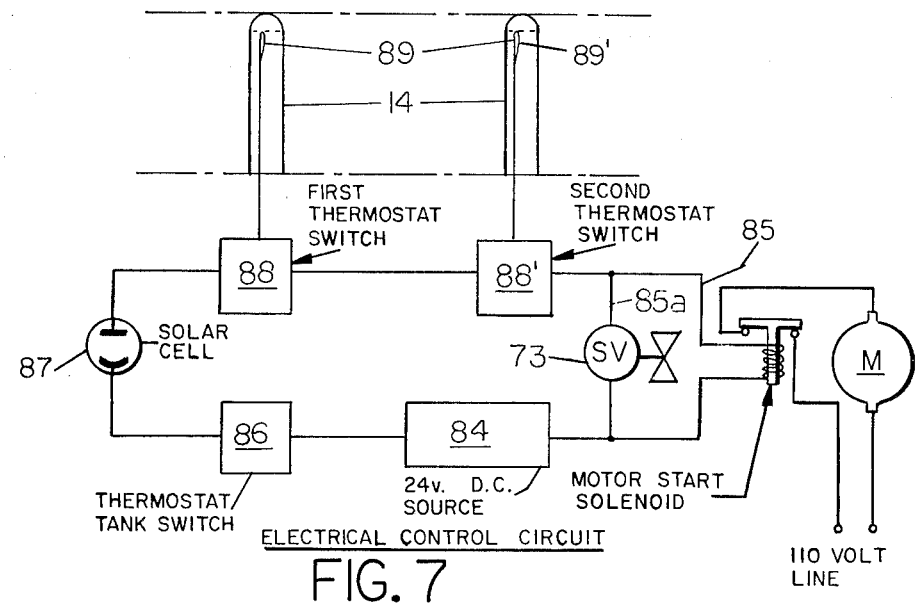
FIG. 7 is a schematic electrical control diagram for the operation of the system shown on FIG. 6.
Figure 3:
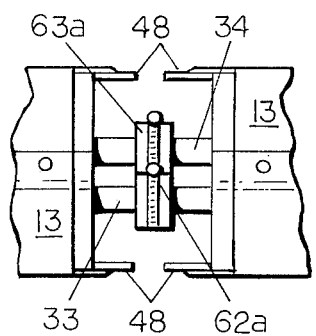
FIG. 3 is a fragmentary view of the connection between two modules or sections of the collector shown on FIG. 1.

Referring to FIG. 7, the schematic electrical control diagram for the unit of FIG. 6 includes 24 volt D.C. electric power source 84 connected in a series circuit 85 including a thermostatic snap-action switch 86 located near the base of solar water tank 71 sensing water temperature. Switch 86 responds to temperature of the water in the lower strata of solar water tank 71 to close at temperatures below a preset level, say 180° F. This regulates the maximum level of energy in solar tank 71.

Switch 87 is a solar cell or light-operated switch that will close upon sensing daylight and open at sunset. This switch responds to the solar day. An example of such switch is commercially available at Lumitrol switch Model T-15, NO. Also in circuit 85 is a first thermostatic switch 88, such as is used in controlling electric ranges (stoves), with variable end set points to close the switch between a range of temperatures. An example is a General Electric Model No. WB 21×178 temperature limit switch with a 48 inch temperature probe (89 on FIG. 7) and extra packing gland. The switch 88 is set so that the circuit will close upon sensing temperatures at its probe element 89 below the range 240° F–290° F. This switch is normally open above the set temperature limits. Each collector array of the installation should include a switch 88 sensing temperature conditions (by 89) in one of the tubes 14 at all times. However, as further safety measure a redundant switch 88' which is the same as switch 88 is preferably installed in separate tube 14 in each array of modules and in series with the first such switch 88. Should the first (switch 88) fail to open in a high temperature condition occurring in the tubes outside the temperature limits selected, this second switch 88' will add assurance that the circuit 85 will be opened. The second switch 88' has its probe element 89' in a separate tube 14 of the module, as is illustrated. The circuit 85 also includes a starter solenoid (shown closed) for the pump motor M driving water pump 78. Motor M of the pump includes its starter control in the 110 v. a.c. power line circuit for power to run the motor and drive the pump. A circuit 85a in parallel with the starter solenoid for electric motor M includes the contacts of the solenoid of solenoid-operated 73. Valve 73 is normally-open and is closed when circuit 85a is energized so that, in closed position, valve 73 is set for blocking pipe line 61a (FIG. 6).

Circuits 85 and 85a are each energized when the series of switches 86, 87, 88 and 88' are closed. This establishes a pumping circuit for flow of solar water from solar tank 71 (FIG. 6), through pump 78 and into the water header pipe 34 of the collectors. (See solid arrows along pipe 61 on FIG. 6). Pump flow and output is regulated in line 61 by the flow valve 75 and flow meter 76 to the desired gpm, as will be mentioned hereinafter.

Referring again to FIGS. 2, 4, and 5, the pump will fill the water header pipe 34 when (a) daylight exists, (b) water in the solar tank is below the preset upper limit, e.g. 180° F., and (c) the inside of tubes 14 are at a temperature within the temperature range limits set for the temperature limit switch(s) 88. The pumping rate in gpm is preferably set for a selected size (dia.) of passageway 70 in the orifice insert and I.D. of vent tube 64. During pumping there is a pressure drop across the passage 70 from pipe 34 to the interior of cup 26-chamber 23 of each solar tube in the system. Water will fill the solar tubes 14 in parallel flow until the water level in the collector tube chamber 23 allows water to spill over the open end 65 of the vent pipe 64, but most importantly the pumping rate will be less than a flow of water through passageway 70 and overflow into vent tube 64 that is needed to completely fill the vent tube. Accordingly, there remains an open air vent passage through tube 64 to the header pipe 33 and back to the solar tank 71. Additionally, the flow, or overflow as the case may be, of water from tube 64 will be to header pipe 33, which is designed to be of sufficient size (diameter) to maintain a flow of both water and air to the solar tank. It is important that the pipe 33 will never fill with water to block the air flow to the tank; otherwise, an undesirable siphoning condition will occur.

The method of operation of the collector described is a "full continuous flow" mode of operation in which the pump operates continuously throughout the solar day subject to conditions which maintain the series switches of the control circuit closed. The continuous flow operation utilizes a principle of thermal stratification of the water in the solar tube chamber such that the uppermost (hottest) water in the solar tube chamber is drawn off and returned to the solar tank.

When the solar tank water contains thermal energy converted from absorbed solar radiation, and the system wishes to utilize that energy, the water (or media) to be heated thereby is pumped from the lower strata of a conventional domestic hot water tank 90 and circulated by pump 91 through heat exchange coils 92 in the solar water tank, then back to the top of water tank 90 via the discharge pipe 93. Hot water as needed is withdrawn by the water line 94 for domestic hot water or like utilization.

Again considering the foregoing full continuous flow method of the invention, if during solar day operation a condition arises to cause one of the switches in the series circuit 85 to open (FIG. 7), two things will occur immediately: (1) the motor M of the pump will stop, and (2) solenoid valve 73 will open. The entire collector system will now drain emptying all the water in the solar tubes to the solar tank via the several passageways 70, header pipe and pipe circuit 61, 61a. In draining, the water follows the dashed arrow path (FIG. 6). Flow in pipe 61 past junction point 72 is prevented by one-way check valve 74. Inasmuch as each passageway 70 is at the low elevation side of its tube cup 26 and tube chamber 23 (FIG. 2), all liquid will drain from the solar tubes and into the solar tank by gravity. Also, when the solar day ends and solar cell switch 87 is caused to open, the entire system drains automatically returning all the water to the solar tank. Since all water is returned to the solar tank 71 at the end of the solar day, maximum amounts of the collected solar energy are kept in the solar tank and thermal losses are minimized. All the collected energy, less line losses, if any, is placed into the solar tank. This avoids the freeze problem of the water and obviates the need for anti-freeze solutions.

SECOND EMBODIMENT OF COLLECTOR

Figure 8:
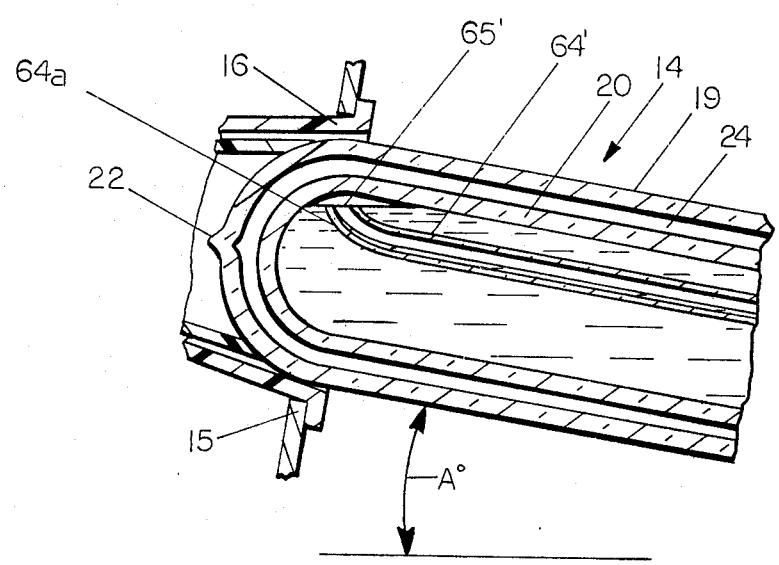
FIG. 8 is a fragmentary sectional view of the upper portion of a solar tube, similar to a portion of the sectional view of FIG. 2, showing a second embodiment of the invention.

FIG. 8 illustrates a further embodiment of the solar collector in which a snorkle form of vent tube 64' includes an upturned bend portion 64a at its open end 65'. This construction places the vent tube opening higher in elevation in the solar tube chamber and close to the upper end thereof which allows operation of the tubes in conditions calling for a shallow (to nearly zero) pitch angle A (see FIG. 2). The snorkle vent tube may be of lesser length, under these conditions, than before, and the solar tube filled fuller in volume with water. Using a shallow pitch angle A for the collectors, this embodiment permits the use of varying lengths of vent tube 64' in the solar collector chamber 23.

EXAMPLE 1

Utilizing the structure of the drainable collector, substantially as described, four collector modules of 8 tubes each were connected end-to-end. Each of the solar tubes 14 in the collectors was equipped with an orifice insert as shown and described herein. The passageway 70 through the insert was sized to 0.093 inch diameter (3/32"). A 10mm size glass vent tube (64) in each of the collector tubes was used. The average I.D. of 10mm glass tubing is approximately 8mm (0.314 inches). Tap water was pumped from the solar tank to the manifold header pipe (34) made of one inch copper pipe and a head about 12 feet above the pump at a flow rate of 0.075 gpm per module (4×0.075 gpm total). In a solar insolation at Corning, N.Y. in the winter season, i.e. December to March, the collector performed at acceptable and satisfactory operating conditions in efficiency in the full continuous mode, described hereinabove. Siphoning was avoided. Filling and draining of the collectors were each satisfactory.

EXAMPLE 2

The same system described in Example 1 was operated at a pumping rate of 0.35 gpm per module (4×0.35 gpm total) and the same satisfactory results. Siphoning was avoided and filling and draining were each satisfactory.

EXAMPLE 3

The same system of Example 1 was used with the exception the orifice passageway in the inserts in each of the collector tubes were 1/16 (0.062") diameter. Pumping rate was kept to 0.05 gpm per module (total of 0.15 gpm). Results were again satisfactory in filling and draining the collectors; and siphoning was avoided.

EXAMPLE 4

The same system described in Example 1 was used with the exception the orifice passageway in the inserts in each of the collector tubes were ⅛ (0.125") diameter. Pumping rate was 0.25 gpm per module (4×0.25 total). The system operated satisfactory in filling and draining the collectors; and the siphoning effect was avoided.

There is need for some pitch of the manifold in the installation back to the drain to the tank (along pipe 34) for draining the collector completely and satisfactory. The collector tubes of the modules are installed with some pitch (angle A) down to the manifold. The water header pipe 34 for draining the water and feeding the water into the collector should be of relatively larger diameter compared to the diameter of the restricted passageway (70) into each cup and chamber of the collector tubes. And, the vent tube I.D. has a definite relationship to the restricted passageway (70) in that it need be larger than the orifice passageway. Pumping rate per module of given number of collector tubes must be established to keep each of the vent tubes in the collectors from filling with water during the full continuous method, as described earlier herein. The hydraulics design will further depend upon the size of the system, i.e. the number of modules. The data given herein has considered a design of up to 10 modules, each module having 8 collector tubes and utilizing standard 10mm glass tubing as the vent tube in each solar collector tube. Water header pipe (34) and air header pipe (33) are of one which diameter standard copper tubing.

The invention herein described demonstrates a solar collector comprised of a plurality of evacuated tubes in a manifold which has the ability to load the interior chamber of all of the tubes in parallel and under control and with sufficient pressure drop in the orifice between the main water header pipe and the interior of the solar tube to overcome any variations in the elevation of flow rates in the return vent tube piping circuit. If otherwise, the system can be subject to siphoning, or can allow boiling of the water in some of the tubes and flow in other tubes. This invention provides an immediate drainability feature upon command. Control may therefore be easily designed for good quality solar energy collection and utilization. Moreover, freeze up of a collector using water as the energy transfer medium is no longer a concern and in down times or between solar periods (days) of energy availability, collected energy is retained in the system most efficiently, i.e. the energy collected is all conducted to the storage facility—the solar tank in this case.

Although water is given as a preferred example for working fluid, it should be understood that other liquids or mixtures may be utilized within the spirit and scope of the invention.

While certain specific embodiments and details of the invention have been described for illustrative purposes, and the best mode contemplated by the inventor is set forth herein, it is evident that various other changes and modifications may be made without departing from the spirit of the invention. In the appended claims, it is intended that all changes and modifications for those given herein and incidental to the spirit of the invention are to be included as part of the invention.

Accordingly, the following is claimed as the invention:

1. A solar energy collector apparatus comprising
a double-wall tubular solar collector member wherein said walls include an annular space therebetween sealed at subatmospheric pressure, said member being closed at one end and open at the other end and including an energy absorbing surface on the inner wall thereof, said outer wall being transparent and said inner wall defining a chamber extending between said ends,
a cup element defining a mouth opening receiving the open end of said solar collector member, and including means providing a annular liquid seal between said cup and tubular solar collector member,
an elongated hollow vent tube extending into said cup element and said chamber, said tube having an axial passageway that is open at its one end within said chamber,
a fluid connection means connected into said cup element remote from said vent tube, said means including a fluid flow restriction means for fluid flow into said chamber at a rate substantially less than the fluid flow rate permitted by said vent tube passageway out of said chamber,
fluid conduit means connected to said fluid connection means outside said cup element for supplying fluid therethrough, and
separate fluid conduit means connected to said vent tube outside said cup element.

2. The apparatus of claim 1 in which there are plural cup elements connected together by an elongated rigid reinforcing member, the mouth of each of said cup elements facing a common direction with their central axes parallel, a plurality of said solar collector members, one of said collector members being sealingly connected about its open end with the mouth of each of said cup elements, the said vent tubes in each of said cup elements being connected externally of each cup element to a first pipe, and the said restricted fluid connection means to each of the cup elements being connected externally thereof to a second pipe, said cup elements, vent tubes, restricted fluid connection, first and second pipes providing a manifold for circulation of liquid internally of said solar collector members in parallel circuit.

3. The apparatus of claim 2 in which the manifold includes a low density foamed polymer insulation surrounding said elongated reinforcing member, the exterior of said cup elements, said fluid connection means thereto, the connection of said vent tubes depending outside said cup elements and said first and second pipes.

4. The apparatus of claim 3 wherein the manifold also includes a shell layer of plastic over the exterior of said low density foamed polymer insulation.

5. The apparatus included in claim 1 or claim 2 wherein said restricted fluid connection means comprises an aperture through a side of said cup element, a conduit connected to the cup element at said aperture, and an orifice insert element in said aperture, said orifice insert element including an axial restricted passageway for liquid flow to said cup element.

6. The apparatus of clam 5 in which the orifice insert element is detachably supported in said aperture by an annular, yieldable gasket member.

7. The apparatus included in claim 1 or claim 2 wherein said elongated vent tube extends axially of the solar collector chamber and includes therein a straight portion and a bent portion terminating at said end opening within said chamber.

8. The apparatus of claim 2 in which each said cup element includes an annular pipe fitting attached thereto opposite its said mouth and opening at one end interiorly of said cup element, the other end thereof depending outside said cup elementf and connected to said first pipe of the manifold, the vent tube of said cup element comprising a length of glass tubing open at its ends and seated in said pipe fitting.

9. The apparatus of claim 8 in which said elongated reinforcing member nestingly engages said pipe fittings at substantially equally spaced intervals along said reinforcing member in the manifold.

10. The apparatus of claim 8 in which said end of the glass tubing is seated in said pipe fitting by an annular gasket.

11. In a solar energy collector apparatus including a double-wall, evacuated, glass tubular collector closed at one end and open at the opposite end defining a chamber open at said opposite end, a cup-like manifold receptacle sealingly connected to the open end of the tubular collector and closing said opposite end of the chamber, the improvement therein comprising:
an axially extending hollow vent tube providing a first passageway to said chamber adjacent said closed end of the tubular collector and extending to the exterior of said receptacle, and
an orifice in said receptacle providing a second passageway to the chamber,
said first passageway being substantially larger in cross-sectional dimension than said second passageway, the latter restricting flow of liquid into said chamber at a rate less than a full flow of liquid permitted in the first passageway, whereby the first passageway upon overflow of liquid in said chamber also provides an air vent for the chamber during flow of liquid into the chamber through said second passageway.

12. A drainable solar energy collector apparatus having plural tubular solar energy collectors each defining an open end and an elongated liquid manifold for interconnecting said tubular collectors in parallel liquid flow, said manifold comprising:

a plurality of cups receiving said collectors at their open end, said cups each including:

an annular side wall defining a mouth opening at one end for receiving the open end of said tubular solar energy collector and an end wall opposite said mouth, the mouth opening of the cups facing a common direction and the axes of the cups being substantially parallel to one another, an axially extending, elongated tube means supported by said cup end wall and depending outwardly therefrom, a restricted-flow aperture in the cup wall spaced from said tube means, said aperture being substantially smaller in section than the internal section of said elongated tube means, a first conduit, a means connecting each of the restricted flow apertures of said cups to said first conduit, a second conduit separate from said first conduit and means connecting each said elongated tube means at the outwardly depending end to said second conduit, said first and second conduits communicating with each other through said tubular solar collector for liquid flow therebetween through parallel interconnection of said restricted flow apertures and said tube means of said plural cups.

13. The apparatus of claim 12 wherein the axially extending, elongated tube means comprises a pipe fitting fastened to the cup end wall at an aperture therein and depending outside the cup, said pipe fitting being connected at its outer depending end to the second conduit, and a length of glass tubing open at its opposite ends, one end being connected to said pipe fitting.

14. The apparatus of claim 13 which includes an elongated straight, rigid member disposed lengthwise of the liquid manifold and aligning all of the cups along the manifold at the end walls thereof.

15. The apparatus of claim 14 in which said glass tubing is connected to the pipe fitting by an encircling resilient gasket.

16. The apparatus of claim 15 in which the pipe fittings depending from the end wall of the cups nestingly engage said elongated member at intervals defining substantially equal spacings of the cups along said member, thereby locating the position of the cups in the manifold.

17. The apparatus of claim 16 in which the manifold includes a low density, cellular polymeric insulation layer exteriorly around the annular side wall and end wall of the cups, said elongated member, the depending pipe fittings, and first and second lengthwise conduits.

18. The apparatus of claim 17 which includes a shell layer of non-cellular plastic overlyingd and substantially encasing the cellular insulation of the manifold.

19. The apparatus of claim 12 wherein said elongated tube means comprises a length of tubing which includes an axial straight portion supported by the cup end wall and a terminal bend portion.

20. The apparatus of claim 17 which includes a third conduit lengthwise in the manifold and included in the said insulation, said conduit being suitable to house electric control wires or the like.

21. The apparatus of claim 18 in which said shell layer of a non-cellular plastic is fiber glass reinforced.

22. The appartus of claim 1 in which the said cup element includes an annular pipe fitting attached thereto opposite said mouth of the cup and opening at one end interiorly of said cup element, the other end said pipe fitting extending outside said cup element and connected to said separate fluid conduit means.

23. The apparatus of claim 22 wherein the vent tube includes a length of glass tubing open at both its ends, one end thereof being seated in said pipe fitting.

24. The apparatus of claim 1 in which the ratio of inside dimension of the cross section of the vent tube passageway to the inside dimension of the cross section of the fluid flow restriction in the fluid connection means is substantially greater than 1.

25. The apparatus of claim 24 in which said ratio is at least 2.5.

26. The apparatus of claim 25 in which said ratio is greater than 5.0.

27. A drainable solar energy collector apparatus comprising a plurality of tubular solar energy collectors having an open end, and an elongated liquid manifold for interconnecting said tubular collectors in parallel liquid flow, said manifold comprising:

a plurality of cups receiving said collectors at their open end, said cups each including:

an annular side wall defining a mouth opening at one end for receiving said tubular solar energy collector, and an end wall opposite said mouth, the mouth opening of the cups facing a common direction and the axes of the cups being substantially parallel to one another, a restricted-flow aperture in the cup wall, an axially extending, elongated vent tube means extending through the wall of said cup into the tubular collector and depending outwardly from said cup, the ratio of the inside cross-dimension of said vent tube to the inside cross-dimension of said aperture being substantially greater than 1.0, a first conduit, a means connecting each of the restricted flow apertures of said cups in parallel to said first conduit, a second conduit separate from said first conduit, and means connecting each said vent tube means to said second conduit, said first and second conduits communicating with each other throughd said tubular collector.

28. The apparatus of claim 27 in which the said means by which said vent tube means are each connected to said second conduit are for parallel flow.

29. The apparatus of claim 27 wherein said ratio is at least 2.5.

30. The apparatus of claim 27 wherein said ratio is greater than 5.0.

* * * * *

UNITED STATES PATENT AND TRADEMARK OFFICE
CERTIFICATE OF CORRECTION

PATENT NO. : 4,262,658
DATED : April 21, 1981
INVENTOR(S) : Joseph R. Frissora

It is certified that error appears in the above-identified patent and that said Letters Patent are hereby corrected as shown below:

Column 5, line 53, "41" should be -- 51 --

Column 14, line 57, "throughd" should be -- through --

Signed and Sealed this

Eighth Day of December 1981

[SEAL]

*Attest:*

GERALD J. MOSSINGHOFF

*Attesting Officer*  *Commissioner of Patents and Trademarks*